Dec. 1, 1942.  H. A. MANTZ  2,303,700
THERMOSTATIC CONTROL DEVICE
Filed June 30, 1939
Fig. 1.
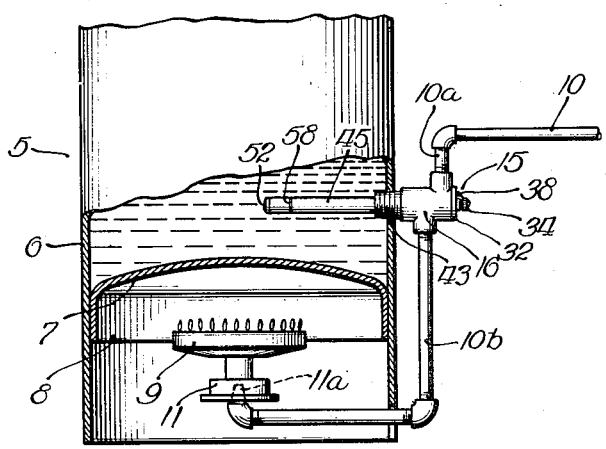
Fig. 2.
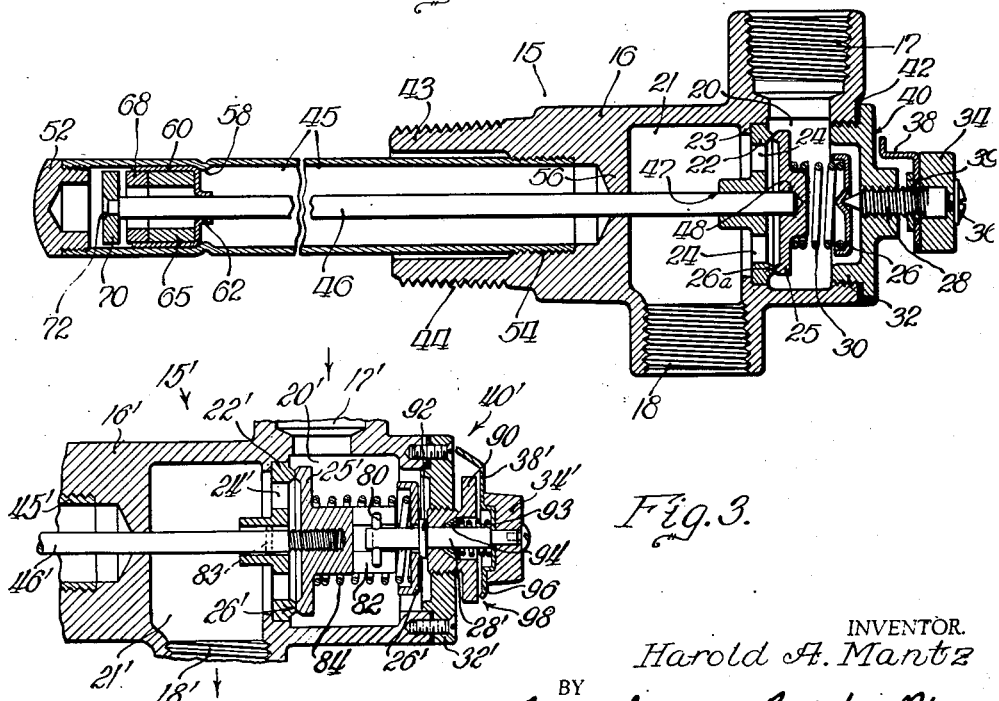
Fig. 3.
INVENTOR.
Harold A. Mantz
BY
Brown, Jackson, Boettcher & Dienner
ATTORNEYS.

Patented Dec. 1, 1942

2,303,700

UNITED STATES PATENT OFFICE 2,303,700

THERMOSTATIC CONTROL DEVICE

Harold A. Mantz, Milwaukee, Wis., assignor to Milwaukee Gas Specialty Company, Milwaukee, Wis., a corporation of Wisconsin Application June 30, 1939, Serial No. 282,096

19 Claims. (Cl. 236—21)

This invention relates to a thermostatic control device.

While the particular device which I shall describe hereinafter in connection with the drawing is a thermostatic control device adapted for use as a safety shut-off device for water heaters and the like, it is to be understood that the invention in its broader aspects is not limited to such use but may be employed for other purposes—for example, in connection with ovens, space heaters, and elsewhere as suitable and desired, and as a heat regulator and safety shut-off device.

One of the main objects of the invention is to provide in a control device of the class described a member made of a temperature sensitive magnetic alloy or of a Curie point material well known in the art, and to utilize the characteristic of this member to be ordinarily magnetic and to become substantially non-magnetic or of reduced magnetic strength when heated to a sufficiently high temperature for securing the desired control upon changes in temperature adjacent the Curie point member.

Another object of the invention is to provide a control device of relatively simple and inexpensive construction, and which is effective and reliable in operation; also a device which is easy to assemble and install, and a device having a quick or snap acting operation for securing the desired control at the desired temperature.

It is also an object of the invention to provide in a heat regulator of the type comprising means for controlling the supply of fuel to the heating apparatus, means for setting the device for the desired temperature, and thermally operative means for operating the control means with temperature changes to maintain substantially selected temperatures, the combination therewith of safety shut-off means for shutting off the supply of fuel if the temperature becomes undesirably high or excessive, or upon other abnormal, defective, or insufficient functioning or non-functioning of the apparatus.

Further objects and advantages of the invention will appear from the following detailed description taken in connection with the accompanying drawing in which:

Figure 1 is a vertical section through a fragment of a water heater showing one illustrative embodiment of the invention in connection therewith;

Figure 2 is a vertical section taken axially through the control device shown in Figure 1, and on a somewhat larger scale than Figure 1; and Figure 3 is a fragmentary section taken axially through another form of device embodying the present invention.

Referring first to Figure 1, a hot water heater is indicated generally at 5 and comprises a tank 6 adapted to contain the water to be heated. The tank 6 has a bottom 7 defining the upper wall of a heater chamber 8 in which is disposed a main burner 9.

The burner 9 is supplied with fuel by a pipe 10 which is connected to the burner through the body of the control device, as will presently appear. Where the burner is a gas burner the fuel supply pipe supplies gas thereto and, in that case, the fuel supply pipe is preferably connected to the burner 9 through a suitable air and gas admixture chamber 11, the fuel delivery nozzle being indicated at 11a.

A pilot burner, not shown, may be associated with the main burner 9 in any suitable or preferred manner. The pilot burner and its fuel supply means forms no part of the present invention, and therefore any showing or further description of the same will be omitted. Where there is a pilot burner, it is intended to remain lighted for the purpose of lighting the main burner whenever a supply of fuel is set up to the main burner. The pilot burner may, for example, be supplied with gaseous fuel by a pilot supply pipe connected to the body of the control device or to the pipe 10 anterior to the regulator, or otherwise as desired.

The control device, indicated in its entirety at 15, comprises a body or casing 16 having a fuel inlet 17 and an outlet 18 disposed with its axis parallel with the axis of the inlet 17 but offset relative thereto, although this may vary widely. The body or casing 16 is provided with an inlet chamber 20 communicating with the inlet 17, and an outlet chamber 21 communicating with the outlet 18. A valve seat 22 is seated against an annular flange 23 and is preferably held in place by a pressed fit in the body 16 or otherwise as desired. The valve seat 22 has ports 24 for placing the inlet chamber 20 in communication with the outlet chamber 21.

A valve disc 25 has an annular raised portion which in the position shown in Figure 2 seats against the annular raised seat 26a of the valve seat member 22, closing and shutting off communication between the inlet chamber 20 and the outlet chamber 21 through the valve seat ports 24. A spring cup 26 has a central depression which seats upon the pointed inner end of an adjusting screw 28. The cup 26 serves as a seat for one end of a compression spring 30 which bears against the valve disc 25 at its other end and tends to hold the valve disc 25 seated or in closed position.

The outer end of the inlet chamber 21 is tapped to receive a valve cap 32, and the screw 28 is threaded through this cap 32 coaxial with respect to the valve disc 25. Fixed against relative rotation on the outer end of the screw 28 and adapted to turn the screw 28 therewith is a temperature selecting or adjusting knob or finger piece 34. The knob 34, which is shown secured to the adjusting screw 28 by a screw 36, may be held against rotation relative to the screw 28 by splining it thereon, or by splaying the outer end of the screw and forming the opening in the knob 34 with a flat portion for cooperation therewith, or otherwise as desired.

A pointer 38 is fixed, for example, by a nut 39, or otherwise, to the knob 34 to turn with the screw. The nut 39 constitutes illustrative means for calibrating the pointer with respect to the temperature scale 40 with which it cooperates. The pointer 38 is offset inwardly along the extension on the valve cap 32, and its outer end is turned outwardly to form a pointer which moves over the dial or scale marked on the valve cap 32 at 40 upon grasping the knob 34 and turning the same to thread the screw 28 into and out of the valve body. The scale 40 has the usual or any preferred temperature markings, the range of which may be of any extent needed for the particular installation. A suitable gasket may be provided at 42 between the valve body and the flange on the cap 32.

The body of casing 16 of the device has an extension 43. This extension is externally threaded at 44 to adapt it to be mounted in the shell or wall of the tank 6 as shown, for example, in Figure 1. The inlet 17 and outlet 18 are tapped internally to receive, respectively, the inlet and outlet pipe sections 10a and 10b of the fuel supply pipe 10 for the main burner.

A tube 45, preferably formed of metal or other good heat conducting material, extends into the tank 6 for contact with the water therein. A rod 46 is disposed coaxially within the tube 45. The rod 46 is slidable axially through an axial opening 47 in the valve seat 22 and, at its outer end, is secured at 48 axially in the valve disc 25. The inner end of the tube 45 is closed by a plug 52 having threaded engagement therein. The other end of the tube 45 extends axially through the extension 43 and is secured to the body 16 as by threaded engagement at 54. The rod 46 has sliding support at a position spaced inwardly from the valve seat 22 in an annular flange 56 integral with the body 16.

Spaced outwardly from its inner end the tube 45 has an annular depression forming an internal annular bead or shoulder 58. A cup 60 seats against the annular bead or shoulder 58 and is held in place in the tube 45 by pressed fit therein, or otherwise as desired. The cup 60 is preferably formed of a good heat conducting metal in good heat conducting contact with the tube 45. The outer end of the cup 60 has an opening surrounded by an annular flange 62 in which the rod 46 has sliding support.

Fixed by pressed fit, or otherwise, in the cup 60 and in good heat conducting contact therewith is a permanent magnet 65 which in the illustrated embodiment of the invention is of annular form. With the increased magnetic strength now obtainable with the proper materials and the right treatment, the permanent magnet 65 may be relatively small and, at the same time, will have suitable strength for the intended purpose. Also fixed by pressed fit or otherwise in the cup 60 and against the permanent magnet 65 is an annular member 68 which is made of a relatively low temperature sensitive magnetic alloy or a relatively low Curie point material well known in the art. The permanent magnet 65 constitutes a source of magnetic flux for the Curie point member 68.

The member 68, by reason of the material of which it is composed and its position against or in proximity to the permanent magnet 65 is ordinarily magnetic but becomes substantially non-magnetic or of reduced magnetic strength when heated to a sufficiently high temperature. In the illustrated embodiment of the invention the critical temperature at which the member 68 becomes non-magnetic, or at least of insufficient magnetic strength to hold the armature 70 in attracted position, is the temperature at which it is desired to operate the safety shut-off means to shut off the supply of fuel to the main burner.

The armature or keeper 70 is fixed at 72 upon the inner end of the rod 46 and is movable within the tube 45 lengthwise thereof and between the plug 52 and the relatively low Curie point metal member 68. The armature or keeper 70 is formed of soft iron or of an alloy or other suitable material adapted to be held in attracted position against the Curie point member 68 as long as this member is magnetic, and to be released for movement to retracted position at the critical temperature at which the member 68 becomes non-magnetic, or at least of insufficient magnetic strength to hold the armature 70 in attracted position.

In operation, as long as the temperature to which the Curie point member is subjected, i. e. the temperature of the water in the tank 6 in the embodiment of the invention illustrated in Figure 1, is below the critical temperature of the Curie point member, the Curie point member is magnetic and attracts the keeper 70 to attracted position and holds the same in such position. Movement of the keeper or armature 70 to attracted position causes endwise movement of the rod 46 to the right as viewed in Figure 2. This moves the valve disc 25 from its seat 26 thereby opening the valve to set up and maintain a supply of fuel to the burner as long as the armature is in attracted position.

If the safety temperature to which the Curie point member 68 is subjected, i. e., the safety temperature of the water in the tank 6, is exceeded, the member 68 instantly becomes non-magnetic or of insufficient magnetic strength to hold the armature 70 in attracted position. As a result, the armature is released and the spring 30 moves the valve member 25 to closed position completely to shut off the supply of fuel to the burner 9. Upon movement of the valve member 25 to closed position the armature 70 is moved to retracted position as shown in Figure 2.

When the temperature drops below the predetermined point, the Curie point member 68 becomes magnetic or of sufficient magnetic strength to attract the armature 70, moving the valve member 25 to open position and maintaining same open until the predetermined temperature is again reached or exceeded.

By rotating the knob or finger piece 34 to set the pointer 38 at the desired temperature marking at 40, the spring 30 is tensioned an amount to actuate the keeper 70 to retracted position and close the valve member 25 at the selected temperature. Therefore, where I refer to the critical temperature of the Curie point member 68 in the present specification and in the appended claims, I refer to the temperature at which the Curie point member becomes of insufficient magnetic strength to hold the valve member 25 open against the tension of the spring for the particular setting as indicated by the pointer 38. Of course the critical temperature may be the temperature at which the Curie point member becomes actually non-magnetic or substantially non-magnetic.

In the embodiment of the invention shown in Figure 1, the Curie point member 68 is of such character that its critical temperature at which it becomes non-magnetic, or at least of insufficient magnetic strength to hold the armature in attracted position, is the same as the maximum safety temperature of the water in the tank. This may vary widely. Where the device is used in connection with oven heaters, space heaters, or other devices, the Curie point member 68 will be of such character that its critical temperature will be the same as the maximum safety temperature at which the safety shut-off device is to operate to shut off the supply of fuel to the burner.

From the foregoing it will be apparent that the device is of simple and inexpensive construction, is effective and reliable in operation, is easy to assemble and install, and has a quick or snap acting shut-off for shutting off the supply of fuel at the desired temperature or upon other abnormal, defective or insufficient functioning or non-functioning of the apparatus.

I have described the invention in connection with the details of a particular embodiment, but I do not intend thereby to limit the invention to such details, nor do I intend to be limited to the particular embodiment and relation of the essential features shown and described.

For example, within the broader aspects of the invention the valve member 25 constitutes a control member. An electric switch may, within such broader aspects, be employed in lieu of the valve member 25. One suitable electric switch arrangement is shown and described in my copending application Serial No. 282,099, filed June 30, 1939. Where employed in lieu of the valve member 25 of the present invention, such switch may be held closed so long as the Curie point member 68 is magnetic, and released for actuation to open circuit position upon heating of the Curie point member to its critical temperature. The switch may, for example, maintain a circuit for a solenoid or motor valve closed to hold such valve open for a supply of fuel as long as the Curie point member 68 is not heated to its critical temperature. Then, at the critical temperature, the Curie point member is demagnetized, whereupon the switch opens the circuit for the solenoid or motor valve, and this valve operates to closed position to shut off the supply of fuel.

For heating the Curie point metal to its critical temperature where the device is used to shut off the supply of fuel upon other abnormal, defective, or insufficient functioning or non-functioning of this or other apparatus, an electric circuit may be provided with an electric resistance or other heating element adjacent the Curie point member 68. In such case, the circuit would be closed or the heating element for the Curie point member otherwise energized upon the other abnormal, defective, or insufficient functioning or non-functioning of the apparatus, and the safety shut-off device would thereupon operate to shut off the supply of fuel.

In Figure 3 I have shown the invention embodied in a heat regulator of the type comprising means for controlling the supply of fuel to the heating apparatus, means for setting the device for the desired temperature, and thermally operative means for operating the control means with temperature changes to maintain substantially selected temperatures.

This latter embodiment of the invention is the same as the preceding embodiment except in the following respects. The tube 45' and rod 46' constitute in this case a rod and tube type thermostat well known in the art. The tube 45' is composed of a thermally responsive metal which has a coefficient of expansion different from the coefficient of expansion of the metal rod 46'. In the particular embodiment shown in Figure 3, the coefficient of expansion of the tube 45' is greater than that of the rod 46'. The rod 46' may, for example, be made of a material which is substantially free from contraction and expansion under temperature changes, and the tube 45' may be made of a metal having a relatively high coefficient of expansion.

The stem 28' constitutes a temperature adjusting or selecting stem, and extends through and is rotatable in a limit control member 90. At its inner end the stem 28' has a diametrically extending pin 80 or other means which engages, for example, in a diametrical slot 82 in the outer end of the valve member 25' to turn the valve member 25' upon rotation of the stem 28'. The valve member 25' is threaded upon the outer end of the thermostat rod 46', and the rod 46' is splined or keyed against turning movement, for example, at 83, being at the same time free for endwise movement as before. The spring 84, which corresponds with the spring 30 of the preceding embodiment, is interposed between the valve member 25' and the spring cup 26'.

The limit control member 90 is threaded through the valve cap 32', and the stem 28' has a flange or shoulder 92 which is positioned between the spring cup 26' and the inner end of the member 90. A spring 93 holds the flange or shoulder 92 against the inner end of the limit control member 90, and also serves to compress and hold the packing 94 in tight sealing relation about the stem 28' and the opening in the member 90 through which the stem extends.

In operation of the embodiment shown in Figure 3, by grasping the knob 34' and turning the stem 28', the valve 25' may be threaded outwardly along the rod 46' to provide any desired amount of valve opening to maintain any desired temperature as indicated by the pointer which will be described presently.

With the selecting means set to provide a valve opening for the selected temperature if the temperature exceeds the selected temperature, there will be a proportionate expansion of at least the thermally sensitive tube 45'. The tube 45' expanding at least more than the rod 46' tends to draw the valve closer to its seat to maintain the selected temperature. If the temperature drops below the selected temperature, the tube 45' contracts with respect to the rod 46' and, as a result, the rod 46' forces the valve 45' further away from its seat to increase the valve opening.

The shut-off temperature may be adjusted by turning the limit control member 90 to increase or decrease the tension in the spring 84. When the knob 34' is turned to adjust the position of the valve member 25', the movement of the valve member 25' changes the tension in the spring 84, and thereby the shut-off or limit control temperature. However, by turning the limit control member 90 the shut-off temperature may be adjusted to any desired temperature with any selected positioning of the valve member 25'.

For the purpose of indicating the shut-off or limit control temperature and the temperature which the thermostat is to maintain, the knob 34' has a pointer 38' which turns with the knob 34' and stem 28', and may be set and secured in different angular positions with respect to the stem 28' to calibrate it relative to its scale. The pointer 38' is shown as cooperating with a dial or scale marked, for instance, on the valve cap 32' at 40' to indicate the temperature which the valve member 25' is set to maintain. Either a portion of the same pointer 38' or another pointer 96, which also turns with the knob 34' and stem 28', cooperates with a dial or scale marked, for instance, on the limit control member 90, at 98, to indicate the temperature at which the Curie point member will operate to release the valve member for movement to safety shut-off position.

Turning of the member 90 to bring any desired temperature marking thereon in register, for instance, with the pointer 96 sets the device so that the valve member 25' will close at that temperature. Turning of the knob 34' to bring the pointer 38' into register with the desired temperature marking on the scale or dial 40' sets the valve member 25' in position to maintain the selected temperature. When the position of the valve is changed to change the temperature to be maintained, and thereby, by changing the tension in the spring 84, changes the safety shut-off temperature, the device may be set for the same safety shut-off temperature as before, or for any other shut-off temperature, by turning the limit control member 90.

In the combination shown in Figure 3, the thermostatic means for maintaining the selected temperature is operative only as long as the armature or keeper shown at 70 in Figure 2 is held in attracted position. Movement of the armature to retracted position not only provides a snap-acting safety shut-off as before, but also renders the rod and tube thermostat inoperative.

I claim:

1. In a device of the class described, a valve body having a valve seat therein, a valve member cooperable with said seat to shut off the flow through the valve body and having an open position out of cooperation with the valve seat, a tube extending from said valve body, a slidably supported rod disposed within said tube and cooperating with said valve member, magnetic means comprising a Curie point member fixed within said tube, and a keeper on said rod in juxtaposition to said Curie point member, said keeper being adapted to be held attracted to the Curie point member to hold the valve member open at temperatures below the critical temperature of the Curie point member and being released for movement of the valve member to closed position at substantially the critical temperature of the Curie point member.

2. In a device of the class described, a valve body having a valve seat therein, a valve member cooperable with said seat to shut off the flow through the valve body and having an open position out of cooperation with the valve seat, a tube extending from said valve body, a slidably supported rod disposed within said tube and cooperating with said valve member, magnetic means comprising a Curie point member fixed within said tube, and a keeper on said rod in juxtaposition to said Curie point member, said keeper being adapted to be held attracted to the Curie point member to hold the valve member open at temperatures below the critical temperature of the Curie point member and being released for movement of the valve member to closed position at substantially the critical temperature of the Curie point member, said magnetic means and Curie point member being of annular form surrounding said rod.

3. In a device of the class described, a valve body having a valve seat therein, a valve member cooperable with said seat to shut off the flow through the valve body and having an open position out of cooperation with the valve seat, a tube extending from said valve body, a slidably supported rod disposed within said tube and cooperating with said valve member, magnetic means comprising a Curie point member fixed within said tube, a keeper on said rod in juxtaposition to said Curie point member, said keeper being adapted to be held attracted to the Curie point member to hold the valve member open at temperatures below the critical temperature of the Curie point member and being released for movement of the valve member to closed position at substantially the critical temperature of the Curie point member, and means on the valve body for adjusting the temperature at which the Curie point member releases said keeper for movement of the valve member to closed position.

4. In a device of the class described, a valve member, a pair of thermostatic members having different coefficients of expansion, one of said thermostatic members cooperating with said valve member, and magnetic means comprising a Curie point member for holding one of the thermostatic members to the other thermostatic member for operating the valve member to different position with temperature variations below the critical temperature of the Curie point member and releasing said thermostatic members from each other for movement of the valve member to closed position at substantially the critical temperature of the Curie point member.

5. In a device of the class described, a valve member, a pair of thermostatic members having different coefficients of expansion, one of said thermostatic members cooperating with said valve member for operating said valve member to different positions by temperature variations adjacent said thermostatic member, magnetic means fixed to one of said thermostatic members and comprising a Curie point member, and a keeper fixed to the other thermostatic member and adapted to be held attracted to said magnetic means at temperatures below the critical temperature of the Curie point member and to be released from said magnetic means for movement of the valve member to closed position at substantially the critical temperature of the Curie point member.

6. In a device of the class described, in combination, a first thermostatic member, a second thermostatic member having a coefficient of expansion different from that of said first member, magnetic means comprising a member of Curie point material for holding said first thermostatic member to said second thermostatic member at temperatures below the critical temperature of said Curie point material and releasing said first thermostatic member from said second thermostatic member at substantially the critical temperature of said Curie point material, and control means adapted to be actuated by relative movement of said thermostatic members upon temperature changes below the critical temperature of said Curie point material and released for movement to safety position upon release of said first thermostatic member from said second thermostatic member at substantially the critical temperature of said Curie point material.

7. In a device of the class described, in combination, a first thermostatic member, a second thermostatic member having a coefficient of expansion different from that of said first member, magnetic means comprising a member of Curie point material for holding said first thermostatic member to said second thermostatic member at temperatures below the critical temperature of said Curie point material and releasing said first thermostatic member from said second thermostatic member at substantially the critical temperature of said Curie point material, control means adapted to be actuated by relative movement of said thermostatic members upon temperature changes below the critical temperature of said Curie point material and released for movement to safety position upon release of said first thermostatic member from said second thermostatic member at substantially the critical temperature of said Curie point material, and selecting means for setting said control means to different selected positions and operable only as long as said first thermostatic member is held to said second thermostatic member by said magnetic means.

8. In a heat regulator and safety shut-off device for heating apparatus, in combination, a first thermostatic member, a second thermostatic member having a coefficient of expansion different from that of said first member, magnetic means for holding said first thermostatic member to said second thermostatic member and for releasing said first thermostatic member from said second thermostatic member, and control means adapted to be actuated by relative movement of said thermostatic members when said first thermostatic member is held to said second thermostatic member and operable to safety position when said first thermostatic member is released.

9. In a device of the class described, in combination, a housing, control means in said housing, a rod and tube thermostat extending from said housing, said rod cooperating with said control means to operate said control means and maintain substantially selected temperatures, magnetic means fixed in said tube and comprising a member of Curie point material, and a keeper on said rod and adapted to be held to said magnetic means at temperatures below the critical temperature of said Curie point material and released for movement of the control means to safety position at substantially the critical temperature of said Curie point material.

10. In a device of the class described, in combination, a housing, control means in said housing, a rod and tube thermostat extending from said housing, said rod cooperating with said control means to operate said control means and maintain substantially selected temperatures, magnetic means fixed in said tube and comprising a member of Curie point material, a keeper on said rod and adapted to be held to said magnetic means at temperatures below the critical temperature of said Curie point material and released for movement of the control means to safety position at substantially the critical temperature of said Curie point material, and selecting means for setting said control means to different selected positions and operable only at temperatures at which said keeper is held to said magnetic means.

11. In a device of the class described, in combination, a housing, a control member in said housing, a spring retainer in said housing, a spring interposed between said control member and said retainer, selecting means cooperable with said spring retainer for setting said control member to different selected positions, a rod and tube thermostat extending from said housing, said rod cooperating at one end with said control member to operate said control member and maintain substantially selected temperatures, a keeper on the opposite end of said rod, and magnetic means fixed in said tube and comprising a member of Curie point material adapted to hold said keeper in attracted position for actuation of said control member by said thermostat upon changes in temperature below the critical temperature of said Curie point material and releasing said keeper for movement of said control member to safety position at substantially the critical temperature of said Curie point material.

12. In a device of the class described, in combination, a valve housing having a fuel inlet and a fuel outlet, a valve member controlling the flow of fuel through said housing, selecting means for setting said valve member to different selected positions, a rod and tube thermostat extending from said housing, said rod cooperating with said control member to operate said control member and maintain substantially selected temperatures, a keeper on said rod, and magnetic means fixed in said tube and comprising a member of Curie point material adapted to hold said keeper in attracted position for actuation of said valve member by said thermostat upon changes in temperature below the critical temperature of said Curie point material and releasing said keeper for movement of said valve member to closed position at substantially the critical temperature of said Curie point material.

13. In a device of the class described, a housing, a control member in said housing, a rod and tube thermostat extending from said housing, a heat conductor cup fixed in said tube, an annular permanent magnet fixed in said cup, an annular member of Curie point material fixed in said cup in position to have magnetic flux set up therein by said permanent magnet, said rod extending through said permanent magnet and said Curie point member, and a keeper on said rod adapted to be held attracted to said Curie point member to hold said control member in operative position at temperatures below the critical temperature of said member and to be released for movement of said control member to safety position at substantially the critical temperature of said member.

14. In a device of the class described, a housing, a control member in said housing, a rod and tube thermostat extending from said housing, a heat conductor cup fixed in said tube, an annular permanent magnet fixed in said cup, an annular member of Curie point material fixed in said cup in position to have magnetic flux set up therein by said permanent magnet, said rod extending through said permanent magnet and said Curie point member, a keeper on said rod adapted to be held attracted ao said Curie point member at temperatures below the critical temperature of said member and to be released for movement to retracted position at substantially the critical temperature of said member, and spring means for actuating said control means to safety position upon release of said keeper.

15. In a device of the class described, a housing, a control member in said housing, a rod and tube thermostat extending from said housing, a heat conductor cup fixed in said tube, an annular permanent magnet fixed in said cup, an annular member of Curie point material fixed in said cup against said permanent magnet, said rod extending through said permanent magnet and said Curie point member, a keeper on said rod adapted to be held attracted to said Curie point member at temperatures below the critical temperature of said member and to be released for movement to retracted position at substantially the critical temperature of said member, spring means for actuating said control means to safety position upon release of said keeper, and selecting means operable through said spring means to set said control member to different selected positions so long as said keeper is in attracted position.

16. In combination, a tank for water, a burner therefor, a fuel supply pipe leading to said burner, a valve in said pipe, a tube extending from said valve and into contact with the water in said tank, a slidably supported rod disposed within said tube and cooperating with said valve, magnetic means comprising a Curie point member fixed within said tube, and a keeper on said rod in juxtaposition to said Curie point member, said keeper being adapted to be held attracted to said Curie point member to hold said valve member open at temperatures below the critical temperature of the Curie point member and being released for movement of said valve to closed position at substantially the critical temperature of said Curie point member.

17. In a device of the class described, in combination, thermostat means, fluid flow control means cooperating mechanically with said thermostat means and adapted for actuation by said thermostat means through its mechanical cooperation therewith, magnet means comprising a member of Curie point material operative to maintain effective mechanical cooperation between said thermostat means and said fluid flow control means at temperatures below the critical temperature of said Curie point material and rendering ineffective the mechanical cooperation between said thermostat means and said fluid flow control means at substantially the critical temperature of said Curie point material, means for actuating said fluid flow control means to safety position when the mechanical cooperation between said thermostat means and said fluid flow control means is rendered ineffective by the heating of said Curie point member substantially to its critical temperature, said magnet means being operatively associated with an armature secured to said control means to set the fluid flow control means to the position in which it is maintained by its mechanical cooperation with said thermostat means.

18. In a heat regulator and safety shutoff device for heating apparatus, in combination, a first thermostatic member, a second thermostatic member having a coefficient of expansion different from that of said first member, magnetic means for holding said first thermostatic member to said second thermostatic member and for releasing said first thermostatic member from said second thermostatic member, and control means adapted to be actuated by relative movement of said thermostatic member when said first thermostatic member is held to said second thermostatic member and operable to safety position by release of said first thermostatic member from said second thermostatic member, said magnetic means being adapted to return one of said thermostatic members to the position in which it is held to the other thermostatic member and to hold same in said position.

19. In a device of the class described, in combination, a rod and tube thermostat comprising a rod and a tube surrounding said rod, said rod and tube being formed of thermally responsive materials having different coefficients of expansion, magnetic means releasably holding said rod to said tube, and a controlling member operable when said rod is held to said tube to different controlling positions by differences in expansion of said rod and tube, said magnetic means being operable upon demagnetization thereof to release said rod from said tube for movement of said controlling member to safety position and adapted when magnetic to return one of said thermostatic members to the position in which it is held to the other thermostatic member and to hold same in said position.

HAROLD A. MANTZ.